Oct. 29, 1929.　　　　G. H. ZELK　　　　1,733,146
TRACTOR HITCH
Filed June 1, 1928　　　3 Sheets-Sheet 3
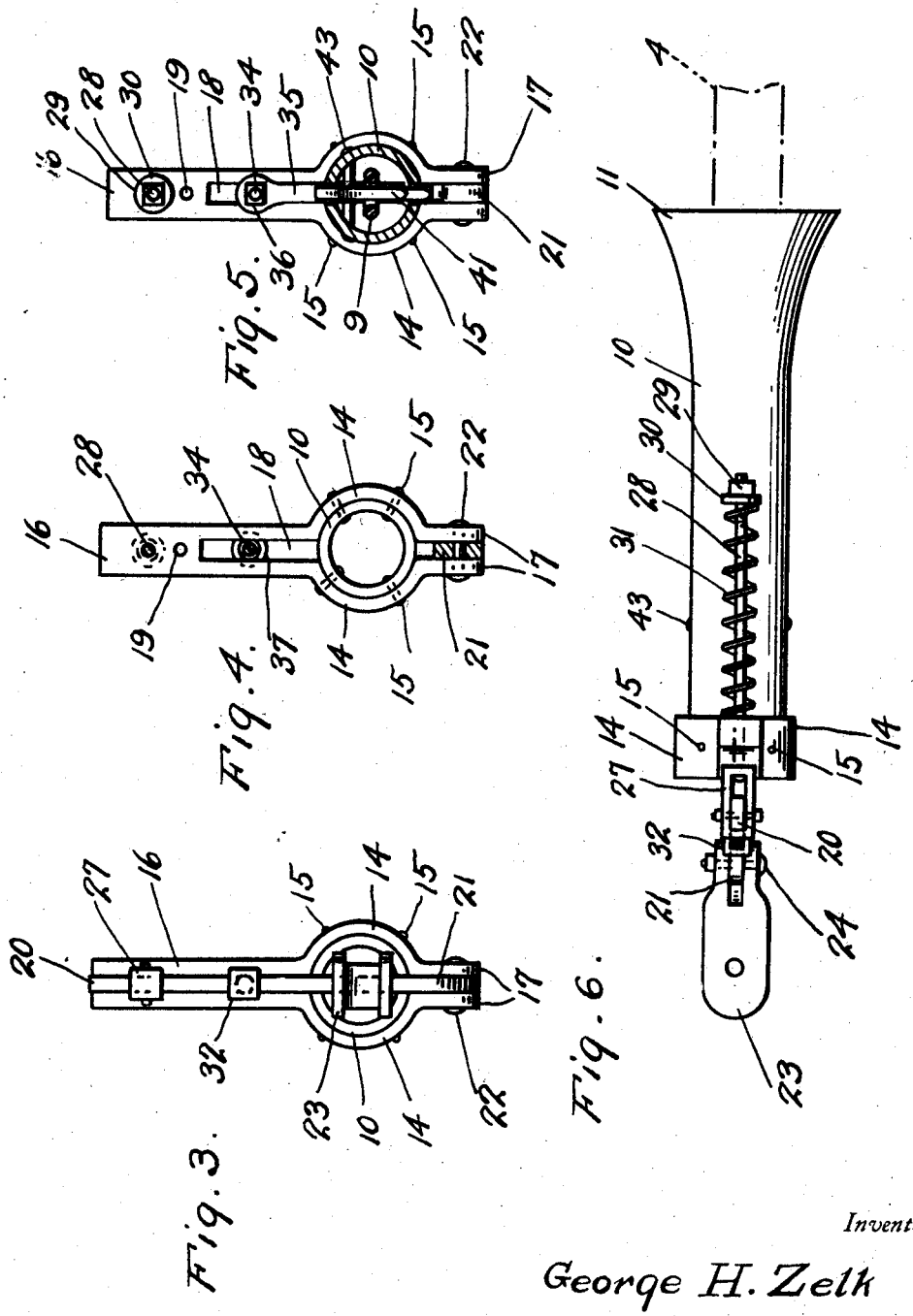
Inventor
George H. Zelk
By Clarence A. O'Brien
Attorney Patented Oct. 29, 1929

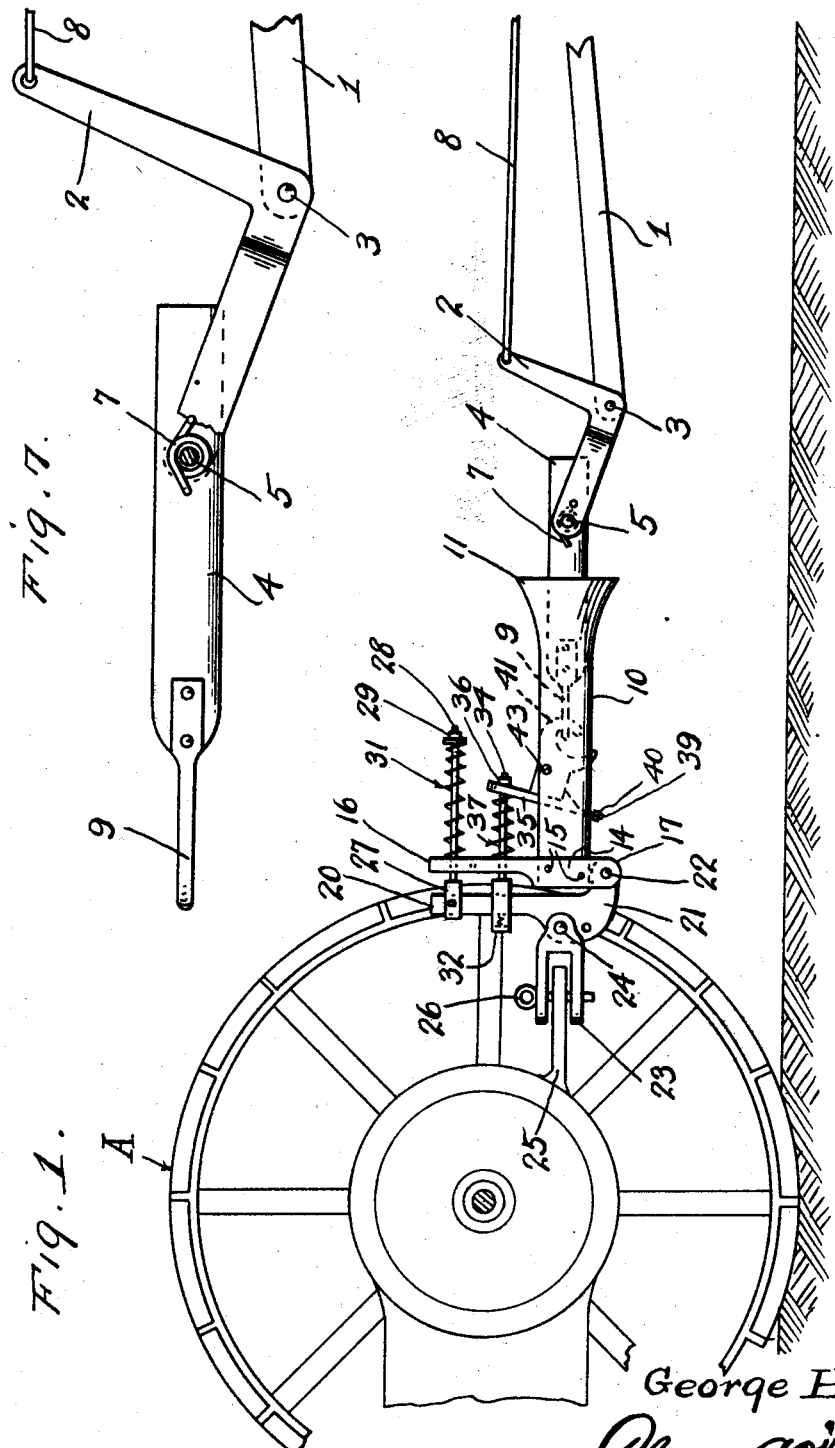

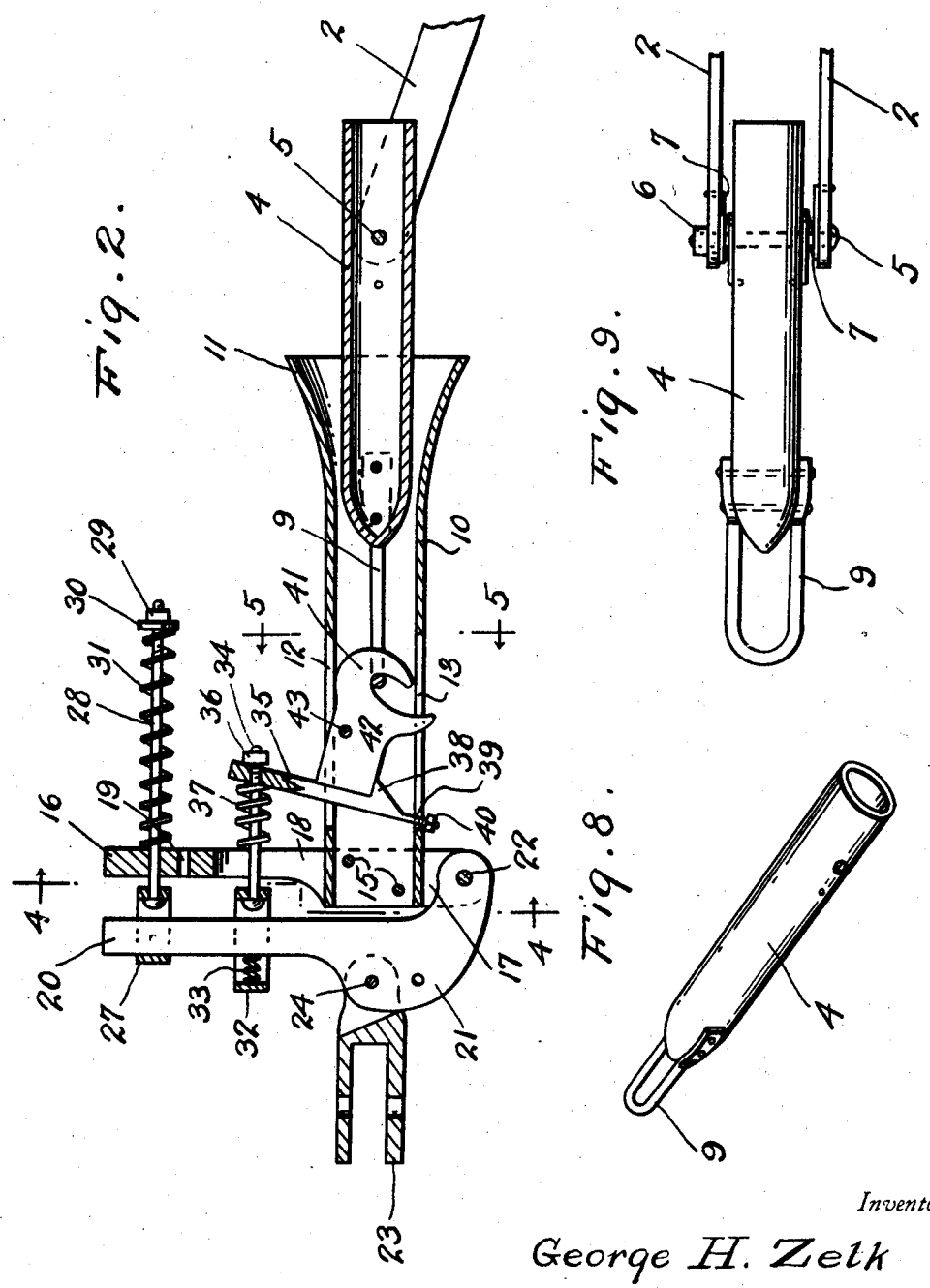

1,733,146

UNITED STATES PATENT OFFICE

GEORGE H. ZELK, OF NORTHWOOD, NORTH DAKOTA

TRACTOR HITCH

Application filed June 1, 1928. Serial No. 282,071.

The present invention relates to improvements in draft devices, and has reference more particularly to an overload release coupling.

One of the principal objects of the present invention is to provide a coupling for connecting an earth engaging implement such as a plow with a tractor whereby the tractor will pull the plow, means being provided for automatically releasing the plow from the tractor when the plow point strikes an obstruction such as a large stone or the like, thereby preventing the plowpoint from becoming broken or otherwise injuring the plow.

A further object is to provide a tractor hitch wherein the earth engaging implement under normal conditions is operatively connected to the draft device, the hitch or coupling being at all times positive and efficient in its operation, and being furthermore automatically opened when undue strain is placed on the hitch.

Still a further object is to provide a tractor hitch of the above mentioned character which is simple in construction, inexpensive, strong and durable and further well adapted to the purpose for which it is designed.

Other objects and advantages of the invention will become apparent during the course of the following description when taken in connection with the accompanying drawing.

In the accompanying drawings wherein like reference characters indicate corresponding parts throughout the several views:

Figure 1 is a side elevation of the tractor hitch embodying my invention showing a plow beam operatively connected to the rear portion of a tractor.

Figure 2 is a longitudinal sectional view through the hitch per se, showing the parts in their normal operative position.

Figure 3 is a forward end elevation of the hitch.

Figure 4 is a vertical sectional view taken approximately on the line 4—4 of Figure 2, looking in the direction of the arrows.

Figure 5 is a similar section taken on the line 5—5 of Figure 2, looking in the opposite direction.

Figure 6 is a top plan view of the hitch, per se.

Figure 7 is a side elevation of the hollow member that is carried by the forward end of the plow beam.

Figure 8 is a detail perspective view of the hollow member per se, and the clevis attached on the closed end thereof, and Figure 9 is a top plan view of this hollow member showing the bell crank lever connected thereto and the axial coil springs associated with the pivotal connection between the bell crank levers and the hollow member.

In the drawing wherein for the purpose of illustration is shown the preferred embodiment of my invention, the numeral 1 designates the forward end portion of a plow beam. A pair of bell crank levers 2 are pivotally secured on the forward free end portion of the plow beam on opposite sides thereof, as at 3. An elongated hollow member 4 that is closed at its forward end is disposed at its rear end between the forwardly extending arms of the bell crank levers, and a pivot forming bolt 5 extends through registering openings formed in the forwardly disposed arms of the bell crank levers at the outer ends thereof, and through the rear end portion of this hollow member, as clearly shown in Figure 9.

A nut 6 is threaded on the threaded end of this bolt. An axial coil spring 7 encircles the bolt 5 on each side of the hollow member 4 and these coil springs are connected at one end to the respective sides of the hollow member, while the other ends of the springs are connected to the respective forwardly extending arms of the bell crank levers 2, as also shown very clearly in Figure 9. This construction provides a means whereby the hollow member 4 is maintained in a substantially horizontal position, and for the purpose of adjusting the hollow member vertically with respect to the forward end portion of the plow beam 1, there is provided an adjusting wire 8 that is connected at its forward end to the upwardly disposed arm of each bell crank lever, the rear ends of these wires being secured in any adjustable manner, not shown, to the plow beam 1.

Secured on the forward end of this hollow member 4 in a stationary manner is the clevis 9, the same being disposed horizontally and the purpose thereof will be presently apparent.

The hollow member is shown very clearly in Figure 8, and it will be observed that the same constitutes a piece of tubing, the forward end of which is closed and slightly pointed.

The tractor hitch further comprises the tubular casing 10 that is open at its respective ends, and the rear end of this casing is flared to provide a funnel shaped mouth 11 into which extends the clevis carrying end of the member 4 that is attached to the forward end of the plow beam, as clearly shown in Figure 2.

This cylindrical casing 10 is formed in its top and bottom with the registering longitudinally extending slots 12 and 13, respectively, and these slots are preferably formed in the intermediate portion of the casing, as shown in Figure 2.

The yoke 14 encircles the forward end of the cylindrical casing 10, and is rigidly secured thereon by the securing means shown at 15. A vertically disposed arm 16 extends from the top of this yoke 14, while a pair of spaced apertured ears 17 depend from the yoke 14, as is more clealy illustrated in Figure 4.

The lower portion of the vertical arm 16 is formed with a longitudinally extending slot 18, while the upper end portion of this arm is provided with the vertically spaced openings 19, the purpose of which will be presently described.

Also forming an important part of the present invention is the vertically disposed bar 20 that is arranged forwardly of the cylindrical casing 10, and the lower end of this equalizing bar is formed with an enlarged and curved tongue 21. The lower extremity of this curved tongue is pivotally secured between the apertured ears 17 as at 22, while the upper portion of this curved tongue is pivotally connected with the vertically slotted rear end of a horizontally disposed clevis 23. The pivotal connection between the clevis and the tongue is shown at 24 with reference more particularly to Figures 1, 2 and 6.

This clevis 23 is detachably secured to the draw bar 25 that is arranged at the rear of the tractor A through the medium of the pin 26 as shown in Figure 1.

A substantially rectangular shaped band 27 is adjustably secured on the upper end of the equalizing bar 20 by a set screw or the like, and the band is greater in length than the width of the upper portion of the equalizer bar so that one end of the band extends in spaced relation with respect to the adjacent side edge of the equalizing bar.

A headed bolt 28 extends through this end of the band, and through one of the openings 19 formed in the upper end of the arm 16. This bolt is relatively long and a nut 29 is threaded on the threaded end thereof. A washer 30 is arranged on the threaded end of the bolt and encircling this bolt for disposition between the rear face of the arm 16 and the washer 30 is the expansible coil spring 31. This spring 31 will normally urge the equalizing bar 20 to the position shown in Figures 1 and 2 of the drawings, wherein the arm 16 will lie substantially parallel with the equalizing bar.

An additional rectangular shaped band 32 is disposed around the intermediate portion of the equalizing bar 20, and this band 32 is larger than the band 27 and both ends of this rectangular shaped band are spaced from the adjacent side edges of the equalizing bar. A relatively light expansible coil spring 33 is interposed between the forward end of the band 32 and the adjacent side edge of the equalizing bar while extending through the other end of this band is the headed bolt 34, the threaded end of this bolt projecting through the slot 18. The spring 33 takes up slack between the band 32 and the equalizing bar 20 to prevent vertical sliding movement therebetween.

A vertically disposed leg 35 is formed at its upper end with an opening through which the threaded end of the bolt 34 extends, and a nut 36 is threaded on the outer end of the bolt for maintaining the leg thereon. An expansible coil spring 37 encircles the intermediate portion of the bolt 34, and is disposed between the slotted portion of the arm 16 and the upper end of the leg 35 for normally urging the leg rearwardly against the nut 26. The spring 37 exerts materially less pressure than the heavier spring 31. The purpose of the spring 37 is to urge leg 35 rearwardly so as to facilitate the lapping of the shanks therewith as will presently appear.

A laterally disposed foot 38 is formed on the lower end portion of this leg 35, and as is clearly shown in Figure 2, the leg extends downwardly into the cylindrical casing 10 through the upper slot 12. A threaded extension 39 is formed on the lower extremity of this leg for disposition through the slot 13, and a nut 40 is arranged on the threaded extension 39 for engagement with the bottom of the casing 10, as also clearly shown in Figure 2.

Cooperating with the clevis bail 9 that is rigidly secured to the forward end of the tubular member 4 is the hook 41 formed on the rear end portion of a relatively short shank 42, and a pivot pin 43 extends through the sides of the casing and through the shank 42, whereby said hook is capable of vertical swinging movement through the registering slots 12 and 13.

The laterally disposed foot or shoulder 38 normally engages with the lower forward end portion of the shank 42, while the forward end of the shank abuts against the rear face of the leg 35 so that the hook 41 is disposed in its lowermost position, and in engagement with the bight portion of the clevis or bail 9, as clearly illustrated in Figure 2.

Normally when the parts are arranged as shown in the drawings, the plow beam is operatively connected to the tractor for movement with the tractor. Should the plow point (not shown) strike an obstruction such as a large stone or the like, whereby to cause an overload or strain to be placed on the hitch, the hook 41 will be disengaged from the clevis or bail 9, and the hollow member 4 that is connected to the forward end of the plow beam 1 through the medium of the bell crank levers 2 will be displaced from the casing 10, and will be maintained off of the ground by reason of the axial coil springs, normally tending to support the hollow member in a horizontal position.

In this manner, the plow will be uncoupled from the tractor so that the plow point will not become broken or otherwise damaged by the strain caused on the constant forward pulling of the plow after the plow point has struck an obstruction.

After the plow point has been freed from the obstruction, the hollow member 4 may again be coupled in the casing 10 so that the hook 41 will engage with the bight portion of the clevis 9 whereupon the tractor can continue to pull the plow over the surface to be plowed.

The simplicity of my improved tractor hitch renders the same at all times positive and efficient, as well as automatic in its operation, and furthermore, the use of brake pins such as are commonly employed in connection with tractor hitches now on the market will be eliminated.

The bolt 28 may be placed in any one of the openings 19 and the slidable band 27 may be adjusted on the upper end of the equalizing bar 20 depending upon the depth at which the plow point enters the ground so as to regulate the strain at which the hook 41 will be tripped and disengaged from the bight portion of the clevis 9.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. In a tractor hitch, a casing open at its rear end, a stationary arm extending upwardly from the forward end of this casing, an equalizing bar arranged vertically and forwardly of the casing, the lower end of this bar being pivotally secured to the bottom forward end portion of the casing, a clevis carried by the equalizing bar for attachment to a draft vehicle, cooperating means between the equalizing bar and said arm for maintaining said members in a predetermined position, a member for attachment to an earth engaging implement, and disposed within the open rear end of the casing, a clevis rigidly secured to the forward end of the last mentioned member, and a pivoted hook arranged in the casing for normal engagement with the clevis to secure the parts in assembled relation, said hook being disengaged from the clevis of the earth engaging implement carrying member when an overload occurs.

2. In a tractor hitch, a casing open at its rear end, a stationary arm extending upwardly from the forward end of this casing, an equalizing bar arranged vertically and forwardly of the casing, the lower end of this bar being pivotally secured to the bottom forward end portion of the casing, a clevis carried by the equalizing bar for attachment to a draft vehicle, cooperating means between the equalizing bar and said arm for maintaining said members in a predetermined position, a member for attachment to an earth engaging implement, and disposed within the open rear end of the casing, a clevis rigidly secured to the forward end of the last mentioned member, and a pivoted hook arranged in the casing for normal relation, said hook being disengaged from the clevis of the earth engaging implement carrying member when an overload occurs, and means for maintaining the hooks in engagement with the clevis under normal conditions.

3. In a tractor hitch, a casing open at its rear end, a stationary arm extending upwardly from the forward end of this casing, an equalizing bar arranged vertically and forwardly of the casing, the lower end of this bar being pivotally secured to the bottom forward end portion of the casing, a clevis carried by the equalizing bar for attachment to a draft vehicle, cooperating means between the equalizing bar and said arm for maintaining said members in a predetermined position, a member for attachment to an earth engaging implement, and disposed within the open rear end of the casing, a clevis rigidly secured to the forward end of the last mentioned member, a pivoted hook arranged in the casing for normal relation, said hook being disengaged from the clevis of the earth engaging implement carrying member when an overload occurs, means for maintaining the hooks in engagement with the clevis under normal conditions, said last mentioned means comprising a leg disposed in the casing and provided with a shoulder intermediate its ends to abut said hooks under normal conditions.

4. A tractor hitch comprising in combination, a horizontally disposed casing open at its rear end, a member for attachment to an earth engaging implement and disposed in the open rear end of the casing, a clevis rigidly secured to the forward end of said member, a stationary arm extending upwardly from the forward end portion of the casing, a vertically disposed equalizing bar, a rearwardly curved tongue formed on the lower end of said bar, the extremity of said tongue being pivotally secured to the under side of the forward end portion of the casing, a tractor attaching clevis connected with the upper portion of said tongue, a bolt extending through the upper end of the arm and connected at one end to the upper end of the equalizing bar, an expansible coil spring associated with the bolt for normally urging the same rearwardly through the arm to maintain the equalizing bar in a vertical position, a pivoted hook mounted in the casing for engagement with the clevis on said aforementioned member, and means for maintaining the hook in engagement with the clevis to connect the earth working implement to the tractor, said implement being disengaged automatically from the tractor when an undue strain occurs.

5. A tractor hitch comprising in combination, a horizontally disposed casing open at its rear end, a member for attachment to an earth engaging implement and disposed in the open rear end of the casing, a clevis rigidly secured to the forward end of said member, a stationary arm extending upwardly from the forward end portion of the casing, a vertically disposed equalizing bar, a rearwardly curved tongue formed on the lower end of said bar, the extremity of said tongue being pivotally secured to the under side of the forward end portion of the casing, a tractor attaching clevis connected with the upper portion of said tongue, a bolt extending through the upper end of the arm and connected at one end to the upper end of the equalizing bar, an expansible coil spring associated with the bolt for normally urging the same rearwardly through the arm to maintain the equalizing bar in a vertical position, a pivoted hook mounted in the casing for engagement with the clevis on the aforementioned member, means for maintaining the hook in engagement with the clevis to connect the earth working implement to the tractor, said implement being disengaged automatically from the tractor when an undue strain occurs, said last mentioned means comprising a bolt carried by the equalizing bar and slidably disposed through the arm, a leg secured on the rear end portion of the bolt, said leg extending downwardly through the casing, a shoulder formed on said leg at the lower portion thereof for engagement with the pivoted end of the hook, and an expansible spring encircling the last mentioned bolt to maintain the shoulder in engagement with said pivoted hook.

6. A tractor hitch comprising in combination, a horizontally disposed casing open at its rear end, a member for attachment to an earth engaging implement and disposed in the open rear end of the casing, a clevis rigidly secured to the forward end of said member, a stationary arm extending upwardly from the forward end portion of the casing, a vertically disposed equalizing bar, a rearwardly curved tongue formed on the lower end of said bar, the extremity of said tongue being pivotally secured to the under side of the forward end portion of the casing, a tractor attaching clevis connected with the upper portion of said tongue, a bolt extending through the upper end of the arm and connected at one end to the upper end of the equalizing bar, an expansible coil spring associated with the bolt for normally urging the same rearwardly through the arm to maintain the equalizing bar in a vertical position, a pivoted hook mounted in the casing for engagement with the clevis on said aforementioned member, means for maintaining the hook in engagement with the clevis to connect the earth working implement to the tractor, said implement disengaging automatically from the tractor when an undue strain occurs, and means for holding the first mentioned member in a horizontal position with respect to the earth engaging implement to which said member is attached.

7. A tractor hitch comprising in combination, a horizontally disposed casing open at its rear end, a member for attachment to an earth engaging implement and disposed in the open rear end of the casing, a clevis rigidly secured to the forward end of said member, a stationary arm extending upwardly from the forward end portion of the casing, a vertically disposed equalizing bar, a rearwardly curved tongue formed on the lower end of said bar, the extremity of said tongue being pivotally secured to the under side of the forward end portion of the casing, a tractor attaching clevis connected with the upper portion of said tongue, a bolt extending through the upper end of the arm and connected at one end to the upper end of the equalizing bar, an expansible coil spring associated with the bolt for normally urging the same rearwardly through the arm to maintain the equalizing bar in a vertical position, a pivoted hook mounted in the casing for engagement with the clevis on said aforementioned member, means for maintaining the hook in engagement with the clevis to connect the earth working implement to the tractor, said implement disengaging automatically from the tractor when an undue strain occurs, means for holding the first mentioned member in a horizontal position with respect to the earth engaging implement to which said members is attached, the last mentioned means comprising a pair of bell crank levers pivoted on opposite sides of the forward end portion of the beam of the earth engaging implement, the forwardly disposed arms of the bell crank levers being pivotally secured to said aforementioned member, axial coil springs encircling said pivot and connected at one end to the member, and at their other ends to the forward arms of the bell crank levers, and means for connecting the other arms of the bell crank levers to the beam.

In testimony whereof I affix my signature.

GEORGE H. ZELK.